Nov. 3, 1959  L. SERVANTY  2,911,618
ARTIFICIAL HORIZON REPEATER
Filed Jan. 13, 1956  2 Sheets-Sheet 1

Inventor
L. Servanty

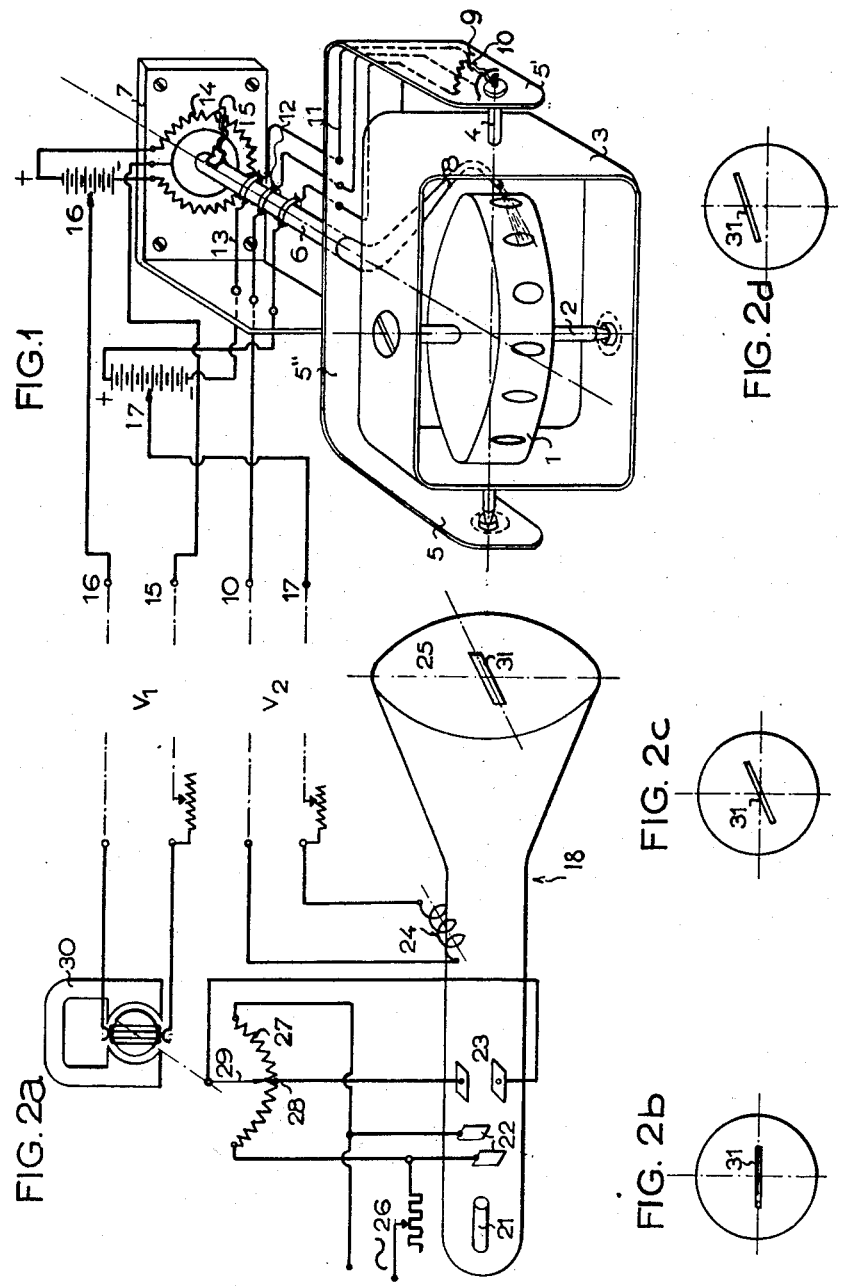

United States Patent Office 2,911,618
Patented Nov. 3, 1959

2,911,618

ARTIFICIAL HORIZON REPEATER

Lucien Servanty, Paris, France, assignor to Societe Nationale de Constructions Aeronautiques du Sud-Ouest, Paris, France, a company of France Application January 13, 1956, Serial No. 559,076

Claims priority, application France January 21, 1955

9 Claims. (Cl. 340—27)

This invention relates to a system for indicating at one or more remote control stations the flight attitude of an aerodyne relative to its horizon.

Several types of artificial horizons are known. For example, in one of them, there is shown on a dial a fixed rear view of a miniature aircraft against a movable horizon bar. If the actual aircraft is climbing, the instrument replica appears above the bar, if gliding or diving, below it. If one wing of the real aircraft is lowered, then the instrument replica appears in this position relative to the bar on the dial. Thus, the pilot obtains a faithful representation of his aircraft attitude. In a usual construction of this type of artificial horizon, the horizon bar is tiltable as well as vertically movable and can, thus, register climb or descent by appearing below or above the miniature aircraft silhouette as well as bank by being more or less inclined with respect to said silhouette.

It is an object of this invention to provide an artificial horizon repeater for producing the flight attitude of a flying body, for example an aircraft or guided missile, at one or more remote control stations on the flying body, or on another flying body, or on the ground.

Another object is to provide an artificial horizon repeater for indicating the attitude of an aerodyne with respect to pitch and roll axes by means of a cathode ray tube located at a point remote from an attitude sensing vertical gyroscope mounted in the aerodyne, said cathode ray tube having horizontally and vertically effective plates and a viewing screen.

The device according to the invention essentially comprises, on board an aerodyne, means capable of generating two electrical effects variable as a function of the pitch and roll relative inclinations of the aerodyne with respect to its horizon and, at one or more remote stations, means responsive to variations of said electrical effects and capable of giving, in response to said variations, indications on the flight attitude of the aerodyne in the same shape as in a conventional board artificial horizon, two transmission channels of any known type such as telephone transmissions, radio electric transmissions, etc. being provided for this purpose between said aerodyne and each one of said remote stations.

It is another object of the invention to provide, for detecting the flight attitude of the aerodyne, a conventional gyro as used in artificial horizons, the said gyro being provided, if desired, with the usual means to compensate the slow deviation of the apparent vertical direction resulting from the sphericity of the earth, with respect to the fixed direction in space of the gyro, as well-known in the art.

Still another object of the invention is to use conventional means for translating the pitch and roll inclinations of the aerodyne into electrical effects, i.e. direct voltages or signals generated thereby, said conventional means being, for example, similar to the translators used in the telemetering art. It is to be noted that whatever may be the electrical effect generated by such a translator, known means may be used for transforming the same into currents proportional to the inclinations to be indicated.

Several blind flight systems are known, wherein the flight attitude is indicated on board the aerodyne in the shape of a linear trace on the screen of a cathode-ray oscillograph. All these known systems, however, have their oscillographs on board the aerodyne, and the manner in which the said linear trace is obtained is unsuitable for remote-transmission. As a matter of fact, the spot is usually obtained, in these devices, by a horizontal scanning controlled by an alternating current of constant amplitude having necessarily the same frequency and the same phase (or phase-shifted by 180°) in respect to the alternating signal of variable amplitude corresponding to the inclination of the aerodyne around the roll axis. This last signal is generated by the roll angle detecting elements of the gyro, while the vertical displacement in respect to the horizon of the pitch axis is represented by a direct current superposed with the vertical scanning alternating current. If a remote-transmission were to be effected from such a known system, three transmitting channels would be required, viz: one channel for the roll signals, another one for the pitch signals and a third one to synchronize the horizontal scanning of the oscillograph.

The repeater according to the invention offers the advantage of requiring two transmitting channels only, due to the fact that the scanning of the oscillograph is independent of the signals corresponding to the roll inclination. A further advantage of the said repeater is to permit using, on board the aerodyne, in combination with the gyro detecting the flight attitude, any type of remote-transmission system (potentiometers, variable inductances, variable capacities) adapted to generate direct or alternating current signals or even pulse signals, the same being in any case, adapted to be transformed into currents proportional to the roll and pitch inclinations, by means of known devices (such as rectifiers, detectors, etc.).

A further object of the invention is to provide an artificial horizon repeater of the type described, wherein the flight attitude of the aerodyne is indicated on the screen of a cathode ray tube at each remote control receiving station, the horizontal and vertical deflecting plates of the tube being fed with sinusoidal alternating current independent of the signals (e.g. of 50–60 c./s. which is the public supply on the ground or 300 c./s. on aircraft). Both these voltages are either in phase coincidence or phase-shifted by 180°, so that the trace formed by the electron beam is rectilinear, which simulates the horizon of the aerodyne in the same manner as the usual horizon bar of a conventional artificial horizon on aircraft. The voltage feeding the horizontal deflecting plates remains constant, while the voltage feeding the vertical deflecting plates has its amplitude varying in proportion with that of the incoming current identifying the roll inclination of the aerodyne, the said amplitude variations being obtained by means of a potentiometer the sliding contact arm of which is actuated by a telemetering device fed with said current. The rectilinear path of the trace will thus be inclined on the screen by an angle varying as a function of the roll angle of the aerodyne. The cathode-ray tube or oscillograph further comprises an additional vertical deflecting means preferably constituted by a coil having its axis horizontal (which permits using standard cathode-ray tubes). The said additional deflecting means is fed with a current proportional to the pitch inclination of the aerodyne, so that the said means causes shifting of the linear trace as a whole in the vertical direction. Thus the said linear trace finally simulates the longitudinal and transverse flight attitude of the aerodyne, in the same manner as the horizon bar of the usual artificial horizon on aircraft thus fulfilling the conditions set forth.

These and other objects will become more fully apparent from the following description and from the accompanying drawings.

In the drawings:

Figure 1 is a diagrammatic perspective view of a detecting device capable of generating two variable voltages respectively proportional to the pitch and roll inclinations of the aerodyne.

Figure 2a is a simplified wiring diagram of the transmitting and receiving means of the device according to the invention.

Figures 2b, 2c and 2d show illustrative examples of flight attitude indications given by the artificial horizon repeater according to the invention.

Figure 3:
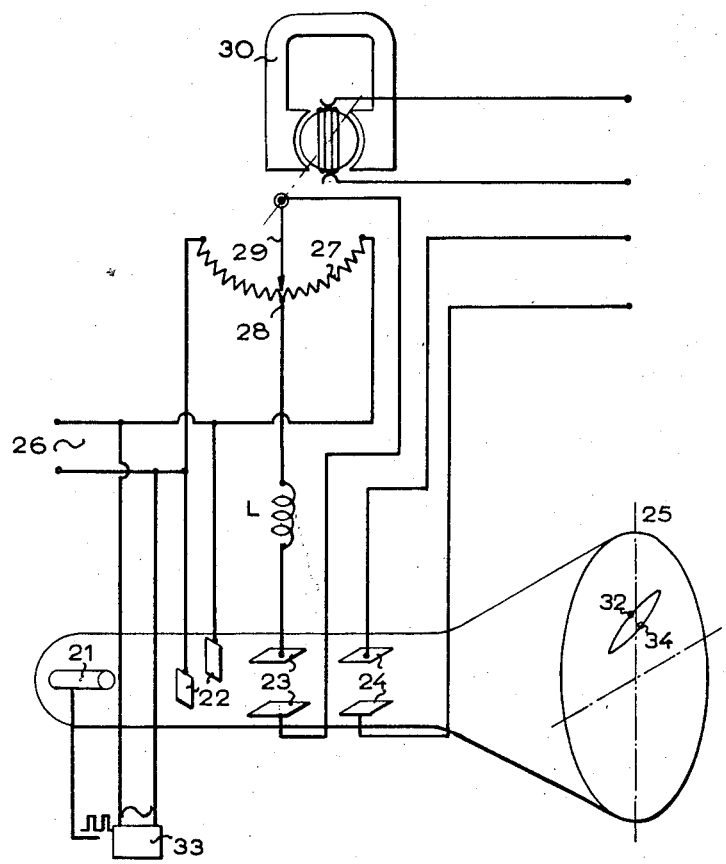
Fig. 3 is a similar view of an alternative embodiment of the receiving means.

Referring first to Fig. 1, it may be seen that, in the example shown, the flight attitude detecting means of the artificial horizon repeater according to the invention, are essentially constituted by a gyro the rotor shaft 2 of which is permanently held aligned with the apparent vertical of the aerodyne by the usual pendulum or other gravity means. The rotor shaft 2 is journalled in a gimbal-ring 3 provided with journals 4 extending at right-angles to the shaft 2 and aligned with the rotation center of the rotor 1. The journals 4 are freely pivoted in a stirrup member 5 freely pivoted, in turn, by means of an axle 6 extending at right-angles to the journals 4 and aligned with the rotation centre of the rotor 1, on a support 7, fixedly secured on board the aerodyne, in such a manner that the geometrical axis of the journals 4 is parallel with either the pitch axis or the roll axis of the aerodyne, while the axle 6 is parallel with the other one of said axes. In the example shown, it will be assumed that the axle 6 is parallel with the roll axis. The axle 6 is hollow and communicates, behind the support 7, through a rotating joint (not shown) with a duct supplying compressed air from any suitable source available on board the aerodyne. The axle 6 is provided with an extension 8 designed as a nozzle capable of blowing air tangentially to the rotor 1, in order to sustain the rotation of the same (e.g. by acting upon small blades or recesses provided on its periphery). If all necessary arrangements are provided to reduce the rotational frictions and if the rotor 1 is rotated at a sufficient speed, the geometrical axis of the shaft 2 will tend to remain in a direction fixed in space but not in relation to the earth. However, the above mentioned usual pendulum compensating means being provided, the said direction tends to be held permanently vertical in respect to the aerodyne.

On the stirrup-member 5 is fixedly secured a potentiometer 9, the sliding contact arm 10 of which is keyed on one of the journals 4, the axis of which permanently remains perpendicular to the vertical. In these conditions, any angular displacement of the aerodyne around the pitch axis causes a relative angular displacement of the same amplitude of the potentiometer zero with respect to the stationary sliding contact arm 10. Three conductors 11 are provided to interconnect the potentiometer 9 with slip rings 12 provided on the axle 6 and associated with brushes 13.

Similarly, another potentiometer 14 is fixedly mounted on the support 7, the sliding contact arm 15 of the said potentiometer being keyed on the axle 6 which is keyed, in turn, on the stirrup-member 5. In these conditions, any angular displacement of the aerodyne around its roll axis causes a relative angular displacement of same amplitude of the zero of the potentiometer 14 with respect to its stationary sliding arm 15.

Thus, if a suitable electric current source, such as the battery shown in the drawing is interconnected with the potentiometer 14, it is possible to derive between the sliding contact arm 15 and a mid-tap 16 a current proportional to the roll inclination of the aerodyne, the polarity of said current depending on the sense of the inclination (right bank or left bank).

Similarly, by feeding a direct current into the potentiometer 9, it is possible to derive between the sliding contact arm 10 and a mid-tap 17 a current proportional to the pitch inclination and the polarity of which depends on the sense of the said inclination (nose up or down).

The diagram of Fig. 2a shows the receiving means of the artificial horizon repeater according to the invention. The said receiving means include a cathode-ray tube 18 constituting the indicator proper. 21 is the electron gun of said tube, 22 are its horizontal deflecting plates, 23 its vertical deflecting plates, 24 an additional vertical deflecting coil and 25 is the screen (for the sake of simplification, the various feeding circuits of the cathode-ray tube—cathode heating circuit, anode circuit, post-accelerating circuit, etc.—as well as the usual adjusting means provided in such a tube have been omitted). The horizontal deflecting plates 22 are fed from a source of alternating current 26 in parallel with the terminals of a potentiometer 27. The vertical deflecting plates 23 are respectively interconnected with a mid-tap 28 and with the sliding contact arm 29 of the potentiometer 27. In the example shown, the horizontal and vertical deflecting plates are fed with currents in phase-coincidence.

The horizontal deflecting plates receive a voltage $T_h = A \cos \omega t$ (A being a constant) while the vertical deflecting plates are fed with a voltage $T_v = b \cos \omega t$, $b$ having positive or negative value varying as a function of the position of the sliding contact arm 29. Thus the trace describes a rectilinear path which is horizontal when $b=0$ (the sliding contact arm 29 being in its mid position) or more or less inclined in either sense according to the deviation of said contact arm relative to said mid position. The sliding contact arm 29 is keyed on the same shaft as the moving coil of a measuring apparatus similar to a voltmeter (in Fig. 2a this apparatus is of the moving-coil type) that receives a voltage proportional to the voltage 15—16 which is in turn proportional to the roll inclination of the aerodyne. Thus the replica of the actual horizon of the aerodyne constituted by the rectilinear trace will be inclined on the screen by an angle varying as a function of the apparent inclination of the actual horizon of the aerodyne with respect to the latter.

The additional vertical deflecting coil 24 is fed with a current proportional to the voltage 10—17, which is in turn proportional to the pitch inclination of the aerodyne. The said coil therefore causes a vertical deflection of the whole index line 31 upwardly or downwardly as a function of the apparent elevation of the actual horizon of the aerodyne with respect to the latter.

Figures 2b, 2c and 2d show several aspects of the instrument index line or horizon bar; for the sake of clarity the usual reference miniature aircraft has not been shown in the drawings. Figure 2b corresponds to straight and level flight; 2c indicates right bank of the aerodyne and 2d indicates descending right turn. If desired, the linear trace instead of simulating the horizon of the aerodyne may represent a rear view of the latter, the relative motion then indicated being that of the aerodyne with respect to its horizon and not as described above the apparent motion of the horizon with respect to the aerodyne. It suffices, to this effect, for example, to reverse the polarities of the batteries shown in the drawings.

The interconnection between the detecting and receiving parts of the system are ensured by transmission links $V_1$ and $V_2$ of any type such as telephone lines or radio channels; such transmission links are well known and will not be described here.

In a general manner, while it has been, in the above description, disclosed what is deemed to be practical and efficient embodiments of the invention, it should be well understood that it is not wished to be limited thereto as there might be changes made in the arrangement, disposition and form of the parts without departing from the principle of the present invention.

In particular, the potentiometers 9 and 15 fed with direct current may be replaced by variable condensers or inductances fed with alternating current, the modulated current thus obtained being then transformed by any known means into direct current before being fed into the receiving part of the system.

Similarly, the potentiometer 27, 28, 29 may be replaced by a mid-tapped inductance-regulator, i.e. by a mid-tapped transformer having a movable primary winding and generating an output proportional to the rotation of the said winding. The latter may be controlled, e.g. by the apparatus 30. The phase of the said output is in a fixed relationship with respect to the input 26, the necessary phase coincidence of the vertical and horizontal deflections being obtained by means of inductances (in the horizontal deflecting circuit) and condensers (in the vertical deflecting circuit). Furthermore, a pair of variable condensers may be interposed between the input 26 and the vertical deflecting circuit, the plates of the said condensers being controlled by the apparatus 30.

Fig. 3 shows an alternative embodiment of the receiving means wherein additional vertical deflecting plates 24 have been substituted for the above described vertical deflecting coil designated by the same reference. Moreover, the feeding circuit of the vertical deflecting plates 23 has been provided with a small inductance L for introducing a slight constant phase-shift between the currents ensuring respectively the horizontal and vertical deflections. This transforms the rectilinear path of the spot into a flat ellipse 32 which reinforces the thickness of the simulated horizon bar. The same may have, moreover, its centre indicated by spot like marks 34. For this purpose it suffices to transform the alternating currents feeding the plates into a series of pulses emitted whenever the said current is nil by any suitable generating means, e.g. consisting in branch circuits 33, the said pulses being used for locally increasing the brightness of the spot.

The transmission system provided between the detectors and the receiver has not been described above, since it is no part of the present invention. It is obvious that if a radio-electric system is used, the same may include, in both transmitting channels hand-adjusting means for varying the output currents, as well as an automatic system (fading-reducer) to keep the output signals at a constant level.

What is claimed is:

1. An artificial horizon repeater for indicating in at least one remote station, the roll-and-pitch flight attitude of an aerodyne comprising, on board said aerodyne, a flight attitude gyro detector and pick-off means operatively associated with said detector to generate two electric signals one of which varies as a function of the roll angle and the other as a function of the pitch angle of said aerodyne, two transmission channels for separately feeding the said remote station with roll and pitch direct current inputs, respectively varying under the control of the said electric signals and, at said remote station, a cathode-ray tube having horizontal deflecting plates, means to feed said horizontal deflecting plates with a first alternating voltage of constant value independent of said inputs, potential varying means to derive from said first alternating voltage a second alternating voltage phase-shifted with respect to said first one by an angle equal to $k\pi$, $k$ being an integer including zero, an electrical measuring instrument having a moving coil, means for feeding said moving coil with said roll input, mechanical motion transmitting means between said moving coil and said potential varying means to cause the same to modulate the amplitude of said second alternating voltage and means to control the vertical deflection in said cathode-ray tube in response to said second alternating voltage and pitch input.

2. An artificial horizon repeater according to claim 1, wherein said flight attitude gyro detector comprises a gyro support fixedly secured on board the aerodyne, a stirrup-member freely pivoted on said support about an axis parallel with either the pitch or roll axis of the areodyne, a gimbal-ring freely pivoted on said stirrup-member about an axis parallel with the other one of said aerodyne axes and intersecting said stirrup-member pivoting axis, a gyro-rotor rotatably mounted on said gimbal-ring about an axis at right angles to said pivoting axis of the gimbal ring and passing through the intersection of the latter axis with said stirrup-member pivoting axis, and erection means, including means for rotating said gyro rotor, to maintain the rotation axis of said gyro rotor in the vertical direction of said aerodyne, and wherein said pick-off means are constituted by two potentiometers, each having a fixed winding and a rotary contact arm slidable on said winding, the fixed winding of one of said potentiometers being fixedly secured on said gyro support, while its contact arm is rotatively fast with said stirrup-member and the fixed winding of the other one of said potentiometers being fixedly secured on said stirrup-member, while its contact arm is fixed to said gimbal-ring, and a mid-tapped battery to permanently feed each one of said fixed windings with direct current of constant value.

3. An artificial horizon repeater according to claim 1, wherein said remote station is located on the ground, and wherein said first alternating voltage of constant value independent of said inputs, provided to feed said cathode-ray tube horizontal deflecting plates, is constituted by an alternating mains supply at 50 or 60 c./s. frequency.

4. An artificial horizon repeater according to claim 1, wherein said remote station is located on board another aerodyne, and wherein said first alternating voltage of constant value independent of said inputs, provided to feed said cathode-ray tube horizontal deflecting plates, is constituted by the alternating current at a frequency comprised between about 300 and 500 c./s. generated by the usual alternating current alternator on board.

5. An artificial horizon repeater according to claim 1, wherein said cathode-ray tube is provided with two separate vertical deflecting systems, the first one of which is constituted by a pair of vertical deflecting plates fed with said second alternating voltage, and the second one of which is constituted by magnetic vertical deflecting means fed with a direct current proportional to the voltage derived from said pitch input.

6. An artificial horizon repeater according to claim 1, wherein said cathode-ray tube is provided with two separate pairs of vertical deflecting plates, the first one of which is fed with said second alternating voltage, while the second one is fed with a direct current voltage derived from said pitch input.

7. An artificial horizon repeater according to claim 1, wherein said potential varying means are constituted by a potentiometer having a sliding contact arm directly driven from said instrument moving coil.

8. An artificial horizon repeater according to claim 6, wherein an inductance of low value is interposed in the feeding circuit of one of said pairs of vertical deflecting plates to slightly shift the phase of the alternating current flowing through said circuit to thereby transform a rectilinear scanning trace into a flat ellipse.

9. A system for indicating the attitude of an aircraft with respect to pitch and roll axes by means of a cathode ray tube located at a point remote from an attitude sensing vertical gyroscope mounted in said aircraft, said cathode ray tube having horizontally and vertically effective plates and a viewing screen, comprising, in combination, a source of alternating voltage, means continuously applying a first alternating voltage, derived from said source, to said horizontally effective plates whereby to produce a single continuous linear trace appearing in a predetermined horizontal reference attitude position on said screen, means continuously applying a second alternating voltage, derived from said source, to said vertically effective plates in a selected phase relation as compared to said first alternating voltage, a telemetering device, means actuated by said telemetering device for varying the amplitude of said second alternating voltage in response to electric quantities received by said device, whereby to rotate said trace with respect to said reference position in accordance with said electric quantities, additional vertical beam deflecting means in said cathode ray tube for translating said trace from coordinated relation with said reference position, pitch responsive and roll responsive means actuated by said gyroscope, a first source of direct voltage, means controlled by said roll responsive means for applying voltage derived from said first direct voltage source to said telemetering device in accordance with the displacement of said aircraft about said roll axis, a second source of direct voltage, and means controlled by said pitch responsive means for applying voltage derived from said second source to said additional beam deflecting means in accordance with the displacement of said aircraft about said pitch axis.

References Cited in the file of this patent

UNITED STATES PATENTS

| | | |
|---|---|---|
| 2,262,245 | Moseley et al. | Nov. 11, 1941 |
| 2,467,412 | Wathen | Apr. 19, 1949 |
| 2,502,721 | Halpert | Apr. 4, 1950 |
| 2,637,911 | Ludwig | May 12, 1953 |
| 2,745,091 | Leffler | May 8, 1956 |